United States Patent
Parris et al.

(10) Patent No.: US 9,505,568 B1
(45) Date of Patent: Nov. 29, 2016

(54) LOADING ARM WITH SOFT-SEAL HATCH CONE ASSEMBLY FOR TOP HATCH OF TRANSPORT TANK

(71) Applicant: SAM CARBIS ASSET MANAGEMENT, LLC, Florence, SC (US)

(72) Inventors: Douglas Parris, Florence, SC (US); Ronald W. Bennett, Florence, SC (US)

(73) Assignee: SAM CARBIS ASSET MANAGEMENT, LLC, Florence, SC (US)

( * ) Notice: Subject to any disclaimer, the term of this patent is extended or adjusted under 35 U.S.C. 154(b) by 94 days.

(21) Appl. No.: 14/682,240

(22) Filed: Apr. 9, 2015

Related U.S. Application Data

(63) Continuation-in-part of application No. 13/616,138, filed on Sep. 14, 2012.

(51) Int. Cl.
B65G 67/06 (2006.01)
B65G 53/40 (2006.01)
B65G 11/02 (2006.01)

(52) U.S. Cl.
CPC ............ B65G 67/06 (2013.01); B65G 11/026 (2013.01); B65G 53/40 (2013.01); *Y10T 137/8807* (2015.04)

(58) Field of Classification Search
CPC .................. Y10T 137/6866; Y10T 137/8807; Y10T 137/9247; B65G 67/06; B65G 53/04; B65G 11/026
USPC ................ 137/615, 800, 347; 141/382, 387; 105/328, 377.01, 377.06, 377.07, 105/377.08; 220/378, 327
See application file for complete search history.

(56) References Cited

U.S. PATENT DOCUMENTS

| | | | |
|---|---|---|---|
| 2,970,347 A * | 2/1961 | Massopust | B61D 19/009 105/377.07 |
| 3,126,591 A | 3/1964 | Hamilton | |
| 3,155,052 A * | 11/1964 | Carney, Jr. | B61D 7/00 105/280 |
| 3,251,487 A | 5/1966 | Giesking | |
| 3,825,045 A * | 7/1974 | Bloomquist | B67D 7/00 137/615 |
| 3,863,688 A * | 2/1975 | Millar | B67D 7/54 141/346 |
| 4,121,616 A | 10/1978 | Lochte et al. | |
| 4,290,463 A | 9/1981 | DeGeorge et al. | |
| 4,371,136 A | 2/1983 | Clay | |
| 4,388,948 A | 6/1983 | Carminati et al. | |
| 4,411,290 A | 10/1983 | Heath | |
| 4,758,970 A | 7/1988 | Keary et al. | |
| 4,987,925 A | 1/1991 | Vroonland | |
| 4,998,560 A | 3/1991 | Le Devehat | |
| 5,622,117 A | 4/1997 | Burian et al. | |
| 5,738,396 A | 4/1998 | Oestermeyer et al. | |
| 5,743,439 A * | 4/1998 | Semenenko | B65G 69/183 141/369 |
| 6,092,471 A | 7/2000 | Early | |

(Continued)

*Primary Examiner* — Michael R Reid
(74) *Attorney, Agent, or Firm* — Dority & Manning, P.A.

(57) ABSTRACT

A loading arm that transfers flowing bulk material from a storage vessel and into a transport tank through a top hatch of the transport tank that is carried on a truck or rail car for transport includes an articulating arm having a plurality of connected hollow pipes. A hatch cone is connected to the arm and defines a top member, a bottom member, an inner shell connecting the top and bottom members and an outer shell extending between the top and bottom members. The outer shell of the hatch cone defines a truncated conical wall that is formed by a resiliently flexible section configured to deform resiliently upon engaging with the top hatch of the transport tank.

20 Claims, 8 Drawing Sheets

(56) References Cited

U.S. PATENT DOCUMENTS

| | | |
|---|---|---|
| 6,494,338 B1 | 12/2002 | Schultz |
| 6,609,873 B2 | 8/2003 | Just |
| 6,843,511 B2 | 1/2005 | Barry |
| 7,147,022 B2 | 12/2006 | Le Devehat |
| 8,166,891 B2 | 5/2012 | Borowski et al. |
| 8,196,523 B2 | 6/2012 | Blevins, Jr. |
| 8,272,527 B2 | 9/2012 | Horn |

* cited by examiner

LOADING ARM WITH SOFT-SEAL HATCH CONE ASSEMBLY FOR TOP HATCH OF TRANSPORT TANK

CROSS-REFERENCE TO RELATED APPLICATIONS

The present application is a continuation-in-part application to application Ser. No. 13/616,138, filed on Sep. 14, 2012, which is hereby incorporated herein in its entirety by this reference for all purposes.

STATEMENT REGARDING FEDERALLY SPONSORED RESEARCH OR DEVELOPMENT

Not applicable.

FIELD OF THE INVENTION

The subject matter disclosed herein generally involves loading arms and/or flexible hoses that transfer flowing material from a storage container into a transport tank carried on a truck or rail car for transport, and particularly to such arms and/or flexible hoses that load the material into the tank through a hatch in the top of the tank.

BACKGROUND OF THE INVENTION

Loading arms that transfer flowing material in bulk from a storage container 15 (shown in phantom in dashed line) into a transport tank (not shown in FIG. 1) carried on a truck or rail car (not shown in FIG. 1) for transport are known. Such conventional loading arms include an articulating arm that is depicted in FIG. 1 and designated generally by the numeral 16. An articulating arm 16 can weigh five or six hundred pounds or more and include a plurality of connected hollow pipes that pivotally articulate in several ways in order to position the arm's outlet 17 over the hatch in the top of the transport tank (not shown in FIG. 1) that is being loaded with fluid (typically a liquid) or fluidized solid material. As schematically shown in FIG. 1, the loading arm 16 can be provided with a mechanism 18 (e.g., a counterbalance spring, a pneumatic cylinder or an hydraulic cylinder) to lower portions of the arm 16 into the transport tank (not shown in FIG. 1) or lift those portions of the arm 16 out of the transport tank.

As schematically shown in FIG. 1, the conventional loading arm 16 can be provided with a hatch plate 19 that is intended to prevent vapors from escaping to the atmosphere during the loading of the bulk material into the transport tank (not shown in FIG. 1). Moreover, though not shown in FIG. 1, such a hatch plate 19 also can be attached to the discharge end of a flexible hose that is used to carry the bulk material from storage into the transport tank (not shown in FIG. 1).

As shown in FIG. 1, a conventional hatch plate 19 can carry a level sensor 20 that projects partially above and partially beneath the hatch plate 19 and senses the level of the bulk material inside the transport tank (not shown in FIG. 1) so that the filling process can be halted before the bulk material overflows the top hatch of the transport tank. As shown in FIG. 1, a conventional hatch plate 19 can carry a vapor pipe 21 that projects partially above the hatch plate 19 and can be connected to a flexible vapor hose 22 that carries off vapor or dust that is given off by the bulk material being transported into the transport tank (not shown in FIG. 1) and allows the vapor or dust to be collected in an exhaust vessel 23 (shown in phantom in dashed line).

As shown in FIG. 1, an input product pipe 24 can extend beneath a conventional hatch plate 19 and project through the top hatch and into the transport tank (not shown in FIG. 1). As shown in FIG. 1, this input product pipe 24 can be provided with a telescoping extension tube 25 that can be selectively dropped down further into the transport tank (not shown in FIG. 1) in order to discharge the bulk material with less splash on the bottom of the transport tank. As shown in FIG. 1, this input product pipe 24 can be provided with one or more electrical ground cables 26 that prevent the buildup of static electricity during the process of filling the transport tank with bulk material.

As shown in FIG. 1, it is known to use a plurality of so-called "J" hooks 27 to secure such hatch plate 19 to the top hatch of a transport tank (not shown in FIG. 1) carried by rail car for example. Though not shown in FIG. 1, a plurality of bolts having one end pivotally connected to the hatch and the opposite end being threaded to receive a threaded nut can be received in slots formed in the peripheral edge of the hatch plate to secure same to the hatch. However, whether due to wear to the hatch or to the hatch plate 19, warping of the hatch plate 19 due to repeated temperature changes from weather or damage to one or both of them through repeated bumping during the process of aligning the arm's hatch plate 19 over the top hatch of the transport tank, gaps can develop between the hatch plate 19 and the top edge of the tank's hatch. Despite the use of such "J" hooks 27 (or bolt and nut fasteners), each such gap allows unwanted vapors or dust to pass between the top edge of the tank's hatch and the underside of the hatch plate 19 and thus escape to the atmosphere during the loading of the bulk material into the transport tank. Moreover, whether due to the operating limitations of the arm 16, uneven tracks beneath the rail car carrying the transport tank or a sloped grade beneath the truck carrying the transport tank, it is not always possible to get the pipe that supports the hatch plate 19 to address the hatch in the ideal alignment that is perpendicular to the plane of the top of the hatch. And the result of such misalignment is the presence of gaps between the top edge of the tank's hatch and the underside of the hatch plate 19 that allows unwanted vapors or dust escaping to the atmosphere during the loading of the bulk material into the transport tank.

BRIEF DESCRIPTION OF THE DRAWINGS

Aspects and advantages of the invention are set forth below in the following description, or may be obvious from the description, or may be learned through practice of embodiments of the invention. Those of ordinary skill in the art will better appreciate the features and aspects of such embodiments, and others, upon review of the specification. A full and enabling disclosure of the present invention, including the best mode thereof to one skilled in the art, is set forth more particularly in this specification, including reference to the accompanying figures, in which.

Figure 1:
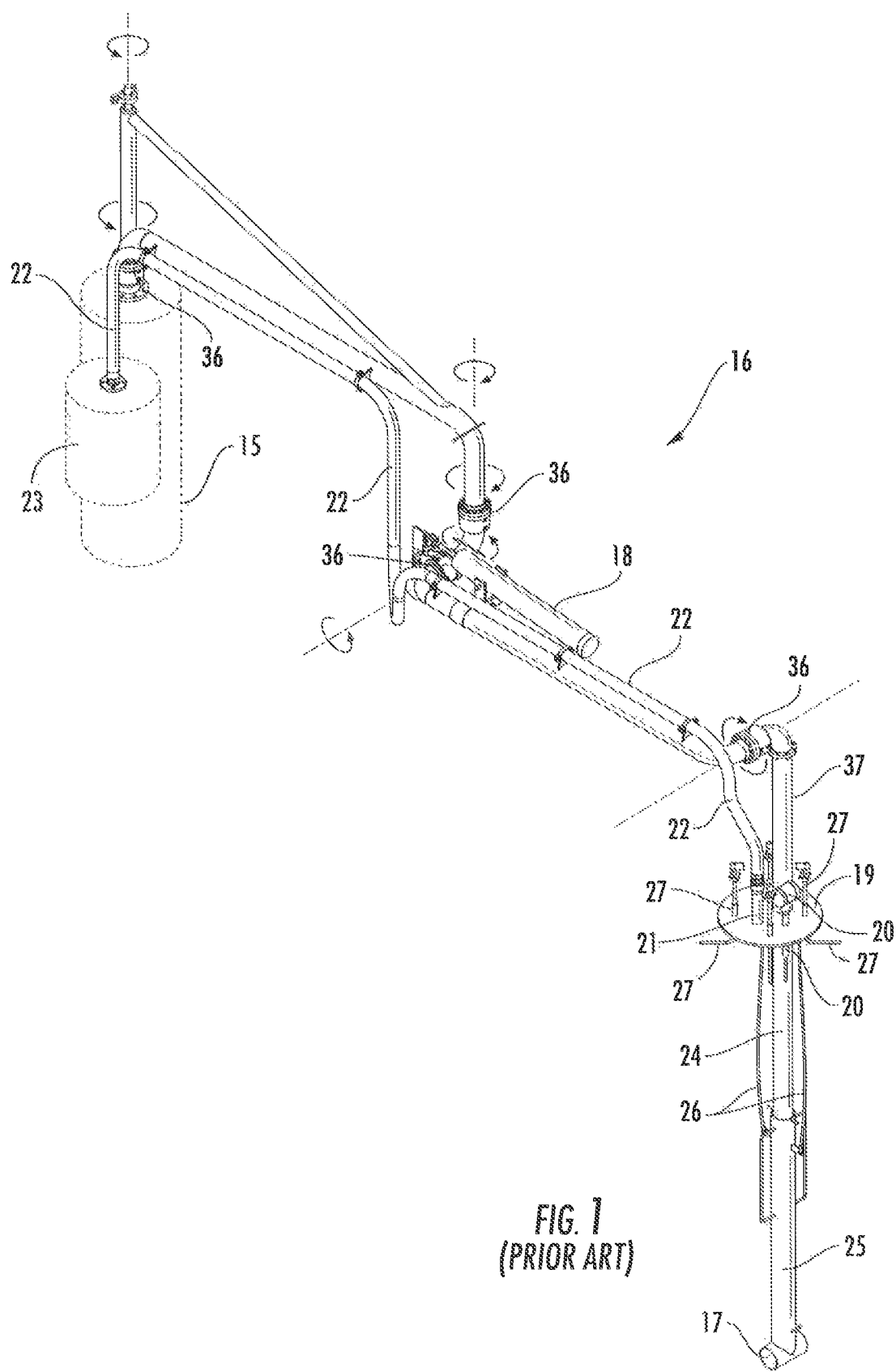
FIG. 1 is an elevated perspective view of a conventional loading arm that transfers flowing bulk material from a storage vessel shown in phantom in dashed line and draws off vapor into a reservoir shown in phantom in dashed line.

The accompanying drawings, which are incorporated in and constitute a part of this specification, illustrate at least one presently preferred embodiment of the invention as well as some alternative embodiments. These drawings, together with the written description, serve to explain the principles of the invention but by no means are intended to be exhaustive of all of the possible manifestations of the invention.

DETAILED DESCRIPTION OF EXEMPLARY EMBODIMENTS OF THE INVENTION

Reference will now be made in detail to present exemplary embodiments of the invention, one or more examples of which are illustrated in the accompanying drawings. The detailed description uses numerical and letter designations to refer to features in the drawings. Like or similar designations in the drawings and description have been used to refer to like or similar parts of the structures.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

It is to be understood that the ranges and limits mentioned herein include all sub-ranges located within the prescribed limits, inclusive of the limits themselves unless otherwise stated. For instance, a range from 100 to 200 also includes all possible sub-ranges, examples of which are from 100 to 150, 170 to 190, 153 to 162, 145.3 to 149.6, and 187 to 200. Further, a limit of up to 7 also includes a limit of up to 5, up to 3, and up to 4.5, as well as all sub-ranges within the limit, such as from about 0 to 5, which includes 0 and includes 5 and from 5.2 to 7, which includes 5.2 and includes 7.

Figure 2:
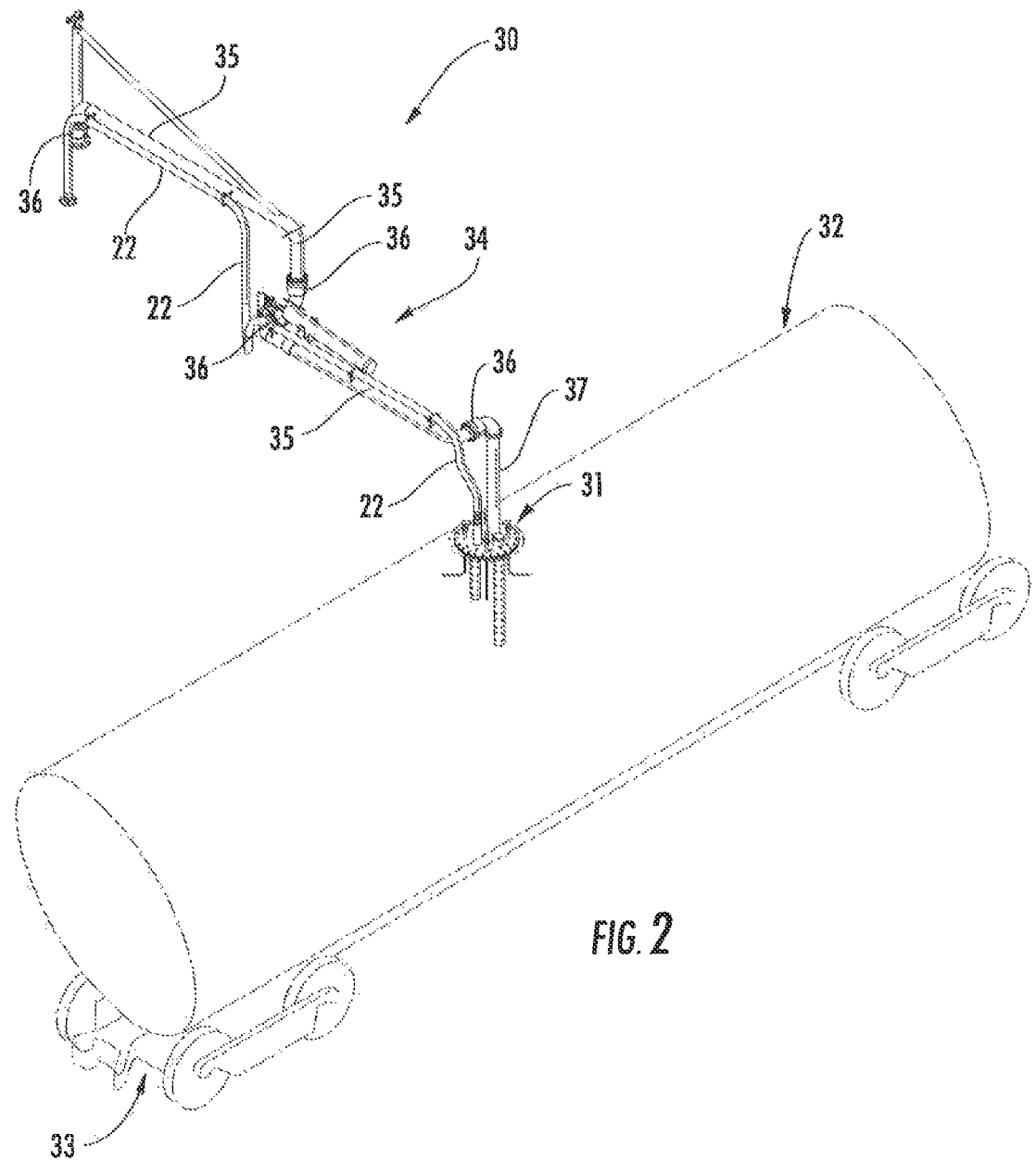
FIG. 2 is an elevated perspective view of an embodiment of a loading arm in accordance with the present invention that transfers flowing bulk material into a container shown in phantom in dashed line through a top hatch of the container that is carried on a truck or rail car shown in phantom in dashed line for transport. Some of the conventional components depicted in FIG. 1 have been omitted in FIG. 2 in order to simplify what is shown in FIG. 2.
Figure 5:
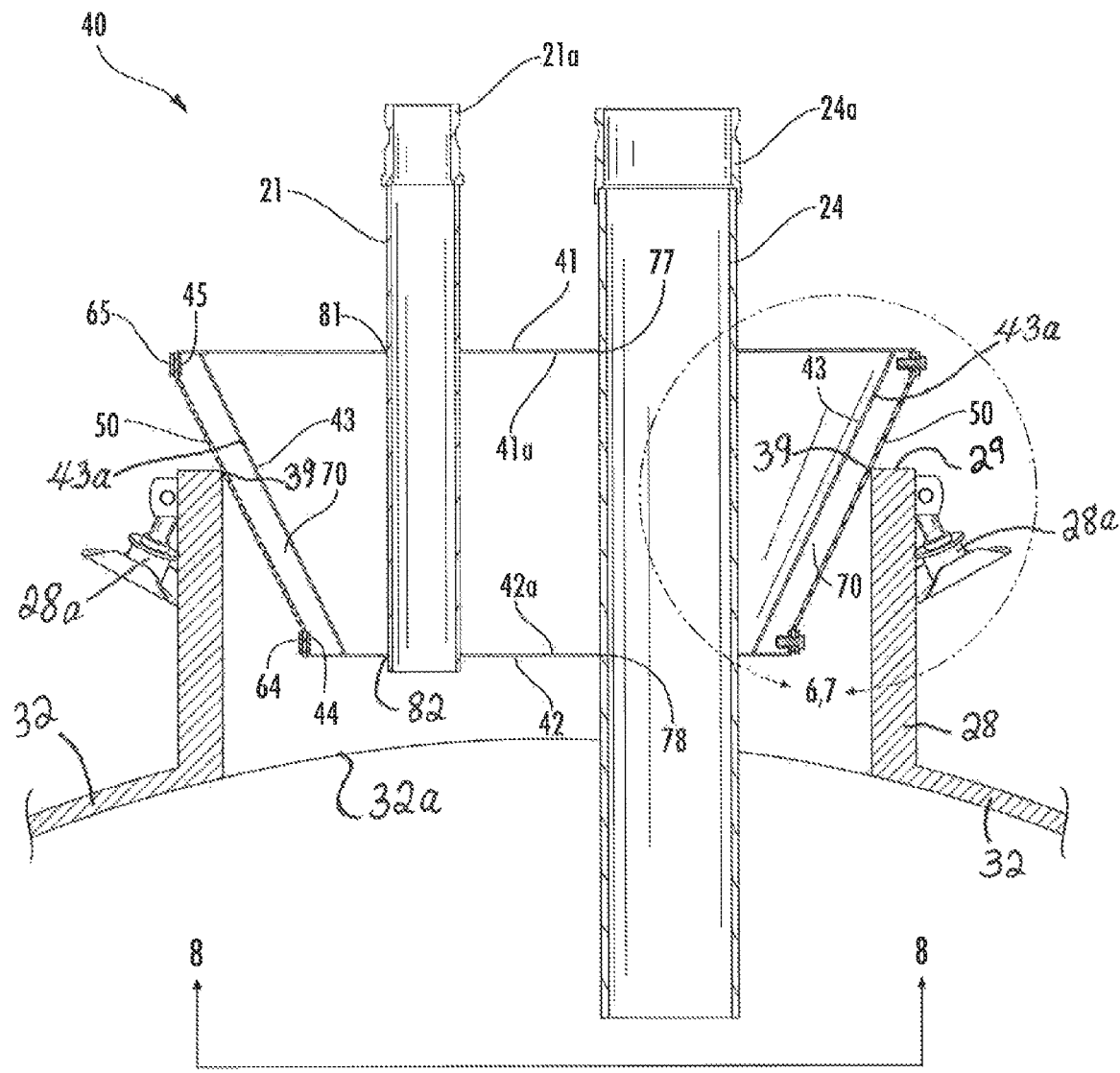
FIG. 5 is a cross-sectional view taken along the lines of sight of the arrows designated 5-5 in FIG. 3 but with the hatch cone shown in its working disposition within the hatch of a container that is partially shown.

One embodiment of the loading arm of the present invention is depicted in FIG. 2 and indicated generally by the numeral 30. FIG. 2 schematically illustrates an embodiment of the loading arm of the present invention with its hatch cone (indicated generally by the numeral 31) positioned over the entrance hatch in the top of a transport tank (schematically shown in phantom in chain-dashed line and indicated generally by the numeral 32) of a railcar (schematically shown in phantom in chain-dashed line and indicated generally by the numeral 33). As shown in FIG. 5 for example, the entrance hatch in the top of a transport tank 32 is the top hatch of the transport tank 32 and typically is defined by a cylindrical wall 28 with a circular opening at each opposite end. As shown in FIG. 5 for example, the opening at the top of the hatch is defined by the inwardly facing upper edge 39 of the hatch. While as shown in FIG. 5 for example, the opening 32a at the bottom of the hatch is defined through the upper wall of the tank 32.

The articulating arm of a loading arm 30 is indicated generally by the numeral 34 in FIG. 2 and includes a plurality of connected hollow pipes 35. As in a conventional loading arm, successive ones of the hollow pipes 35 desirably are connected together so that one pipe 35 can pivot with respect to the other pipe 35 via a pivoting joint 36 that includes a rotatable bearing. The internal diameter of the hollow passages defined by the pipes 35 and pivoting connecting joints 36 is typically about 4 inches. The flowing bulk material that is to be transported through the hollow pipes 35 and pivoting connecting joints 36 typically is a liquid and often is a volatile liquid that gives off vapor at room temperatures. As in a conventional loading arm, the loading arm 30 of the present invention typically includes a flexible hose 22 that typically has an internal diameter of about 2 inches and carries off vapor (and or dust) that is given off by the bulk liquid material being transported into the transport tank 32. The horizontal reach of the loading arm 30 typically is on the order of 17½ feet to the center of the top member 41 of the hatch cone 31 of the present invention. The distal end of the articulating arm 34 of the loading arm 30 is the end farthest from the storage container 15 (FIG. 1) where the bulk material is stored prior to transfer via the loading arm 30 into the transport tank 32 carried on the truck or rail car 33. As shown in FIGS. 1 and 2 for example, the pipe of the articulating arm 34 at the distal end thereof desirably defines a discharge pipe 37. Alternatively, as shown in FIG. 3, the pipe of the articulating arm at the distal end thereof can define a flexible discharge hose 48, which can bend in any direction as well as elongate in the axial direction due to the stretching of the accordion-like folds of the hose 48.

Figure 3:
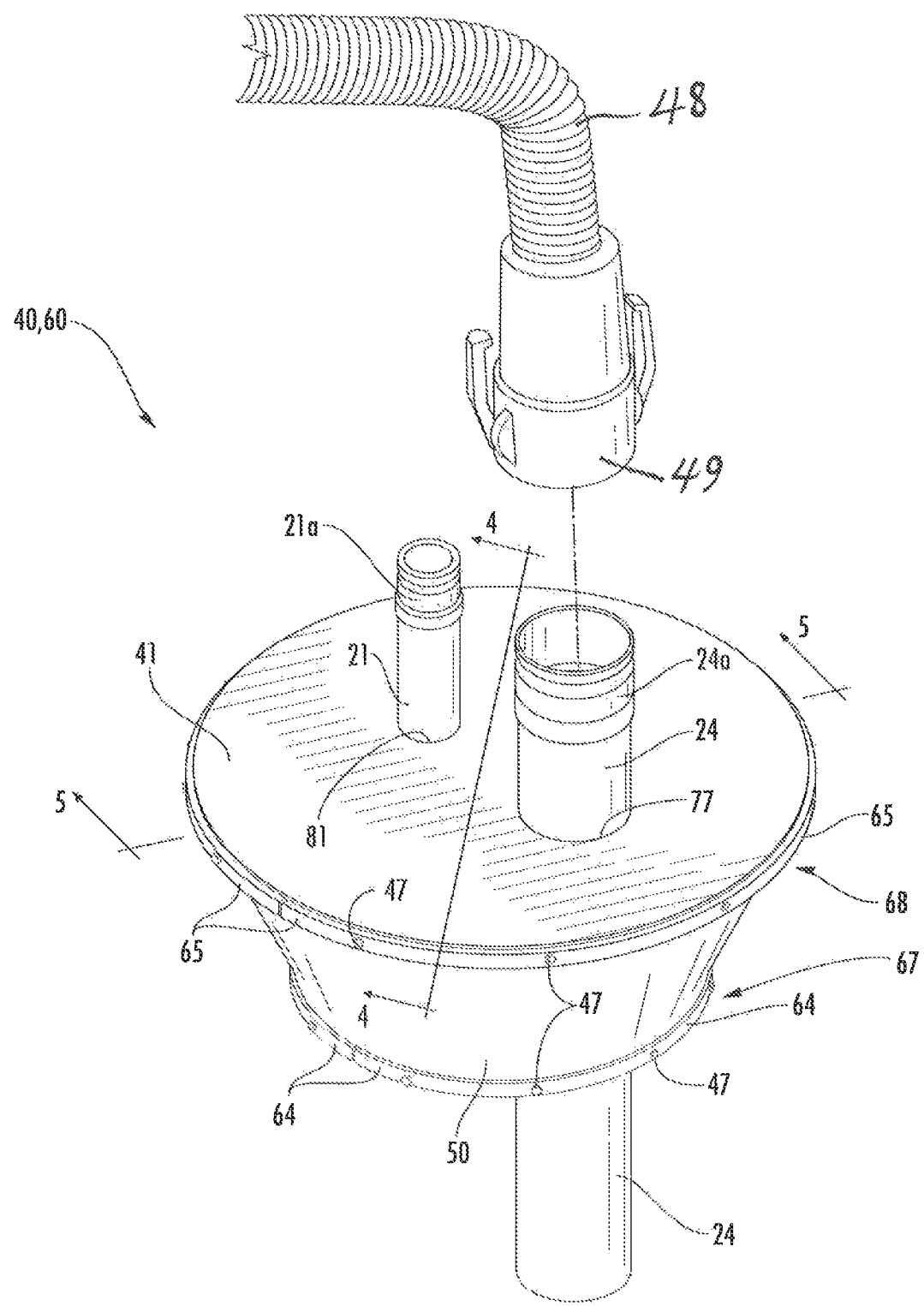
FIG. 3 is an elevated perspective view of embodiments of soft-seal hatch cone assemblies in accordance with the present invention.
Figure 4:
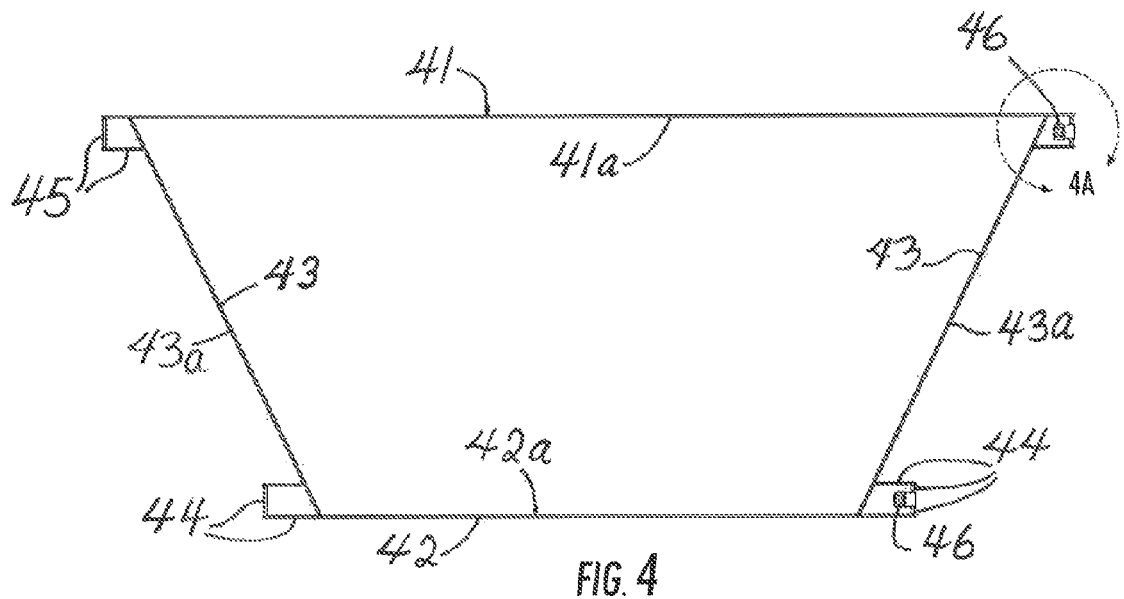
FIG. 4 is a partial cross-sectional view taken along the lines of sight of the arrows designated 4-4 in FIG. 3 and depicting only an embodiment of a rigid frame of a hatch cone in accordance with the present invention.
Figure 7:
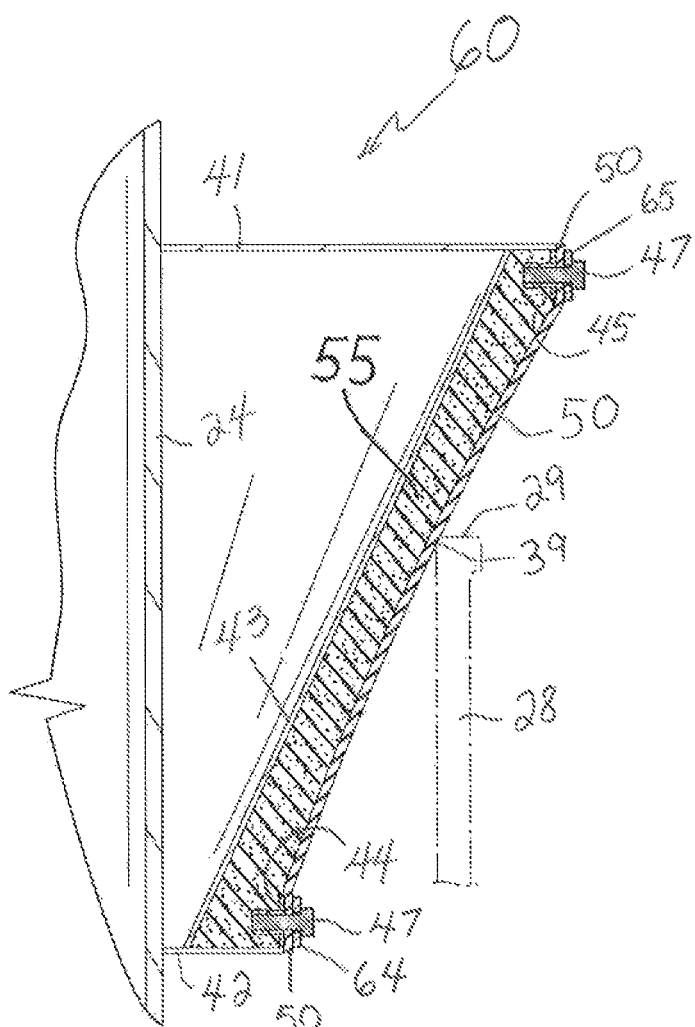
FIG. 7 depicts an alternative embodiment in an enlarged cross-sectional view that is similar to the view shown in FIG. 6 with part of the hatch of the container shown in chain dashed line.
Figure 8:
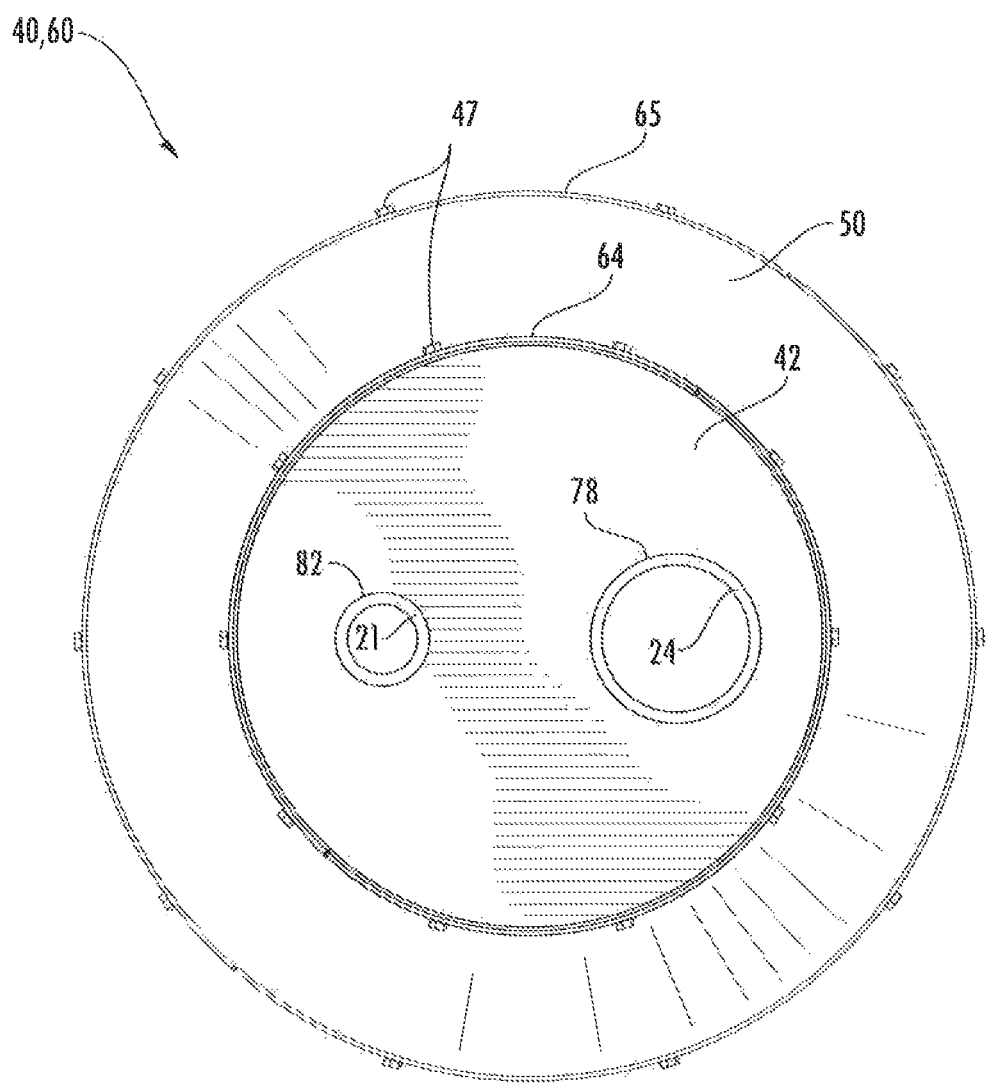
FIG. 8 is a view taken along the lines of sight designated 8-8 in FIG. 5.

From the perspective of the views shown in FIGS. 3 and 8, two different embodiments of a hatch cone 40, 60 are depicted. Features of a conventional hatch cone 19 like those described above and shown in FIG. 1 have been omitted from FIGS. 3-8 in order to avoid unduly complicating certain features of embodiments of the present invention but nonetheless can be added to such embodiments in a conventional manner, if desired. The respective differences between these two embodiments 40, 60 become apparent in the similar cross-sectional views shown in each of FIGS. 6 and 7 for example. Each hatch cone 40, 60 desirably defines a rigid frame that includes a top member 41, a bottom member 42, and an inner shell 43 that connects the respective top member 41 and the respective bottom member 42. As shown in FIG. 4 for example, the bottom member 42 is spaced apart in the axial direction from the top member 41 and defines an upper surface 42a disposed facing the underside 41a of the top member 41.

As shown in FIGS. 4 and 5 for example, the respective bottom member 42 of each embodiment of the hatch cone 40, 60 of the present invention desirably elongates in a plane that is disposed perpendicular to the axial direction and has a diameter that is intended to be smaller than the diameter of the circular fill opening of the top hatch of the transport tank 32 and thus smaller than the diameter of the respective top member 41 of the frame. The respective top member 41 of each embodiment of the hatch cone 40, 60 of the present invention desirably elongates in a plane that is disposed perpendicular to the axial direction and parallel to the plane of the bottom member 42 and has a diameter that is intended to be larger than the inside diameter of the circular fill opening that is defined internally of the wall 28 of the top hatch of the transport tank 32. As shown in FIGS. 4, 4A, 5 and 6A for example, the inner shell 43 desirably defines a truncated conical overall shape and a truncated conical outer surface 43a.

Figure 4A:
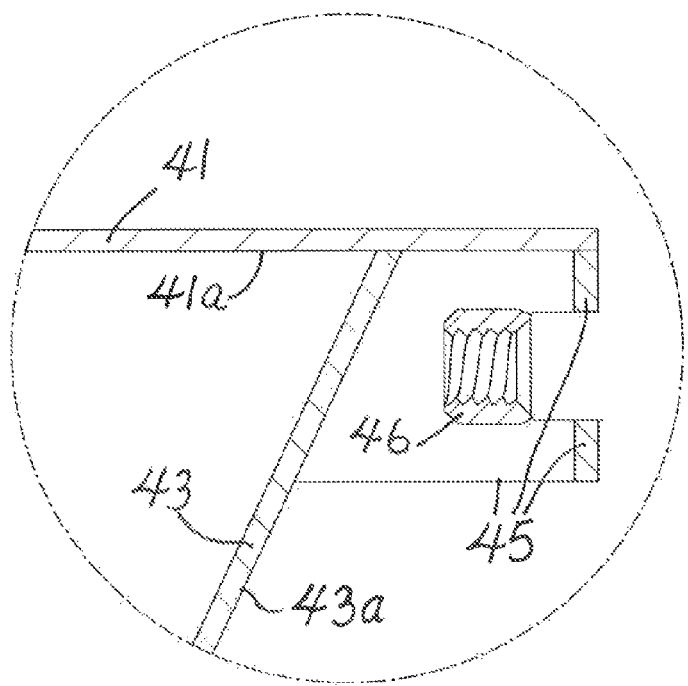
FIG. 4A is an enlarged cross-sectional view of the detail designated 4A in FIG. 4.
Figure 6:
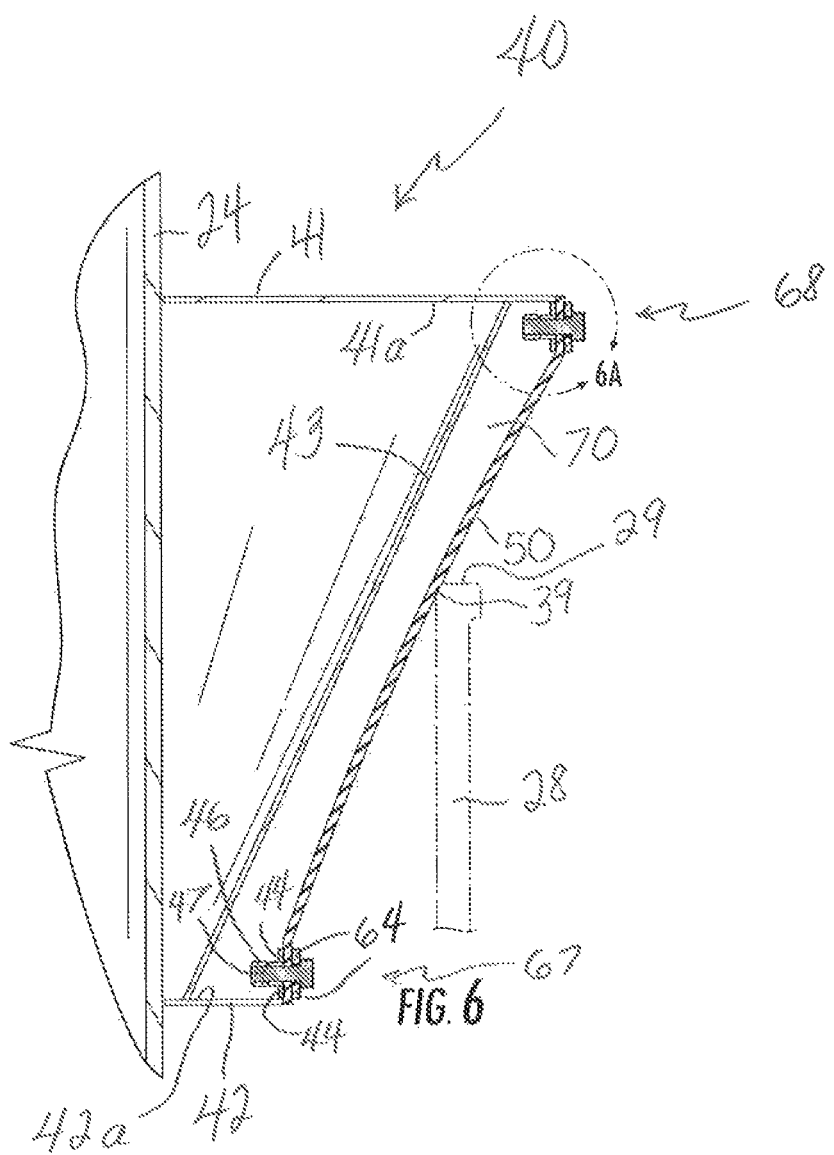
FIG. 6 is an enlarged cross-sectional view of the detail designated 6 in FIG. 5 with part of the hatch of the container shown in chain dashed line.

As shown in FIGS. 4 and 5 for example, the larger diameter end of the inner shell 43 is attached to the top member 41, and the smaller diameter end of the truncated conical inner shell 43 is attached to the bottom member 42. As shown in FIG. 4A for example, the free edge of the larger diameter end of the inner shell 43 desirably is welded to the underside 41a, which is the side that faces internally of the hatch cone 40, 60, of the top member 41 of the respective hatch cone 40, 60. As shown in FIG. 6 for example, the free edge of the smaller diameter end of the conical inner shell 43 desirably is welded to the upper surface 42a of the bottom member 42 of the respective hatch cone 40, 60 that faces the interior of the hatch cone 40, 60.

As shown in FIGS. 4 and 6 for example, the frame also desirably includes a lower ring 44 and an upper ring 45. The main differences between the two rings 44, 45 reside in their locations and diameters. Each of the upper ring 45 and lower ring 44 desirably defines a continuous hoop having a cylindrical contour that follows the circular free edge of the respective top member 41 and bottom member 42. As shown in FIG. 4 for example, the upper ring 45 is spaced radially outwardly from where the truncated conical inner shell 43 is attached to the underside 41a of the top member 41. As shown in FIG. 4A, the upper end edge of the upper ring 45 desirably is connected, as by being attached by being welded, to the underside 41a of the outermost portion of the top member 41. Though not shown in an exploded view, the lower end edge of the lower ring 44 desirably is similarly connected, as by being attached by being welded, to the internally-facing upper surface 42a of the outermost portion of the bottom member 42. As shown in FIG. 4 for example, the lower ring 44 is spaced radially outwardly from where the truncated conical inner shell 43 is attached to the upper surface 42a of the bottom member 42.

Each of lower ring 44 and the upper ring 45 desirably is formed of a ⅛ inch thick annular ring of stainless steel that is three-quarter inches wide. Each respective lower ring 44 and the upper ring 45 desirably is formed by being cut transversely from a tubular extrusion. Alternatively, each lower ring 44 and the upper ring 45 can be formed from a respective strip formed of a ⅛ inch thick stainless steel sheet that is three-quarter inches wide and that wrapped around a forming mandrel until it is disposed end-to-end to be formed into a circular ring or continuous hoop 44, 45. Each of the lower ring 44 and the upper ring 45 desirably is attached to the respective bottom member 42 or top member 41 so that the width dimension of each ring 44, 45 extends in the axial direction, which is perpendicular to the plane of each of the top member 41 and bottom member 42. In one exemplary embodiment, the inside diameter of the upper ring 45 desirably measures about 24¼ inches while the inside diameter of the lower ring 44 measures about 16 inches. Thus, the length of each respective strip needed to form the lower ring 44 and the upper ring 45 can be calculated by multiplying the diameter by TT. Each of the lower ring 44 and upper ring 45 is provided with a plurality of holes that are evenly spaced apart along the length of each ring 44, 45 and centered along a centerline that in this case desirably measures ⅜ of an inch (or halfway) from the circumferential edge of each ring 44, 45. Each of the lower ring 44 and upper ring 45 desirably is provided with ten of these evenly spaced apart holes. Each of the plurality of holes desirably is defined radially through the upper ring 45, and each of the plurality of holes desirably is defined radially through the lower ring 44.

As shown in FIG. 4A for example, a respective threaded insert 46 is inserted through each of the respective ten holes, and the cylindrical sleeve of each threaded insert 46 is attached permanently to the circular edge that defines each of the respective ten holes. Thus, the internally threaded nut portion of each respective threaded insert 46 becomes disposed between the respective ring 44, 45 and the truncated conical shell 43. Desirably, the opening of the cylindrical threaded portion of each threaded insert 46 has a quarter inch diameter. Desirably, the internally threaded cylindrical portion of each threaded insert 46 is aligned radially with respect to the respective ring 44, 45.

Each of the respective top member 41, bottom member 42, truncated conical shell 43, lower ring 44 and upper ring 45 that constitutes the frame of the respective embodiment of each hatch cone 40, 60 desirably is formed from ⅛ inch thick stainless steel sheet. In one exemplary embodiment with the configuration such as shown in FIG. 5 for example, the axial distance between the upper surface of the top member 41 and the lower surface of the bottom member 42 desirably is about ten inches if the diameter of the top member is about two feet and the diameter of the bottom member is about sixteen inches.

In each of the embodiments of the hatch cones 40, 60, as respectively shown in FIGS. 6 and 7, the respective hatch cone 40, 60 defines an outer shell that is disposed by being spaced radially outwardly from the inner shell 43 and extending between the top member 41 and the bottom member 42. The outer shell desirably is formed by a resiliently flexible section 50 that is configured to deform resiliently upon engaging with the vertical wall 28 that defines the top hatch of the transport tank 32 (FIG. 5), and particularly with the upper surface 29 or the inwardly facing upper edge 39 of the cylindrical wall 28 of the top hatch of the transport tank 32. The outer shell 50 desirably has a truncated conical shape and is formed of resiliently deformable material. In one embodiment of the outer shell 50, that material desirably is formed by a ⅛ inch thick sheet of VITON gasket. However, whether the resiliently flexible section 50 desirably is formed of an elastomer that is on the order of one eighth to one quarter inches thick depends on the material and its hardness, which desirably are determined depending on the dimensions of the hatch opening and the nature of the bulk material that is being carried by the transport tank 32. Moreover, in order to accommodate these different conditions (especially the characteristics of the bulk material that is being carried by the transport tank 32) likely to be encountered by the loading arm 30 of the present invention, elastomers of different thicknesses, hardnesses, compositions, pliabilities, flexibilities, deformabilities, etc. can be changed out in each hatch cone 40, 60 by undoing the selectively detachable fasteners that in some embodiments may include hex bolts 47 (FIG. 4A) that secure the elastomers 50 in place.

In the embodiments of the hatch cone 40, 60 shown in FIGS. 3-8 for example, the resiliently flexible section 50 of the hatch cone 40, 60 defines a truncated conical outer shell 50 that is radially spaced away from the rigid truncated conical inner shell 43 of the frame by a distance on the order of one inch so as to define therebetween a closed space 70 schematically shown in FIG. 5 for example. The truncated conical outer shell 50 extending between the upper ring 45 and the lower ring 44 is shaped to mirror the shape of the conical outer surface of the inner truncated conical shell 43. In the cross-sectional view shown in FIG. 5, the angled sides of each of the respective truncated conical inner shell 43 and truncated conical outer shell 50 formed two sides of a trapezoidal shape. The truncated conical inner shell 43 nests within the truncated conical outer shell 50. Desirably, the angled sides of the truncated conical inner shell 43 are parallel to the angled sides of the truncated conical outer shell 50. Thus, in the embodiment of the hatch cone 40, 60 of FIG. 3 for example, the resiliently flexible section 50 desirably takes the form of a truncated cone.

Figure 6A:
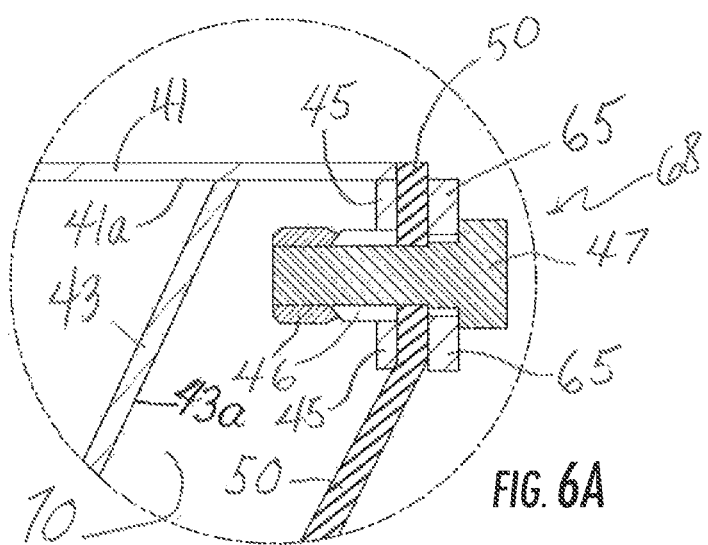
FIG. 6A is an enlarged cross-sectional view of the detail designated 6A in FIG. 6.

FIG. 6A is an enlarged cross-sectional view that illustrates the manner in which the resiliently flexible section 50 is attached to the frame of each hatch cone 40, 60 embodiment, both to the lower ring 44 (FIG. 4) of the frame and to the upper ring 45 of the frame. The truncated conical outer shell 50 defines a larger diameter free edge at one end thereof and a smaller diameter free edge at an opposite end thereof. The larger diameter free edge of the truncated conical outer shell 50 is connected to the upper ring 45, and the smaller diameter free edge of the conical outer shell 50 is connected to the lower ring 44.

Desirably, as schematically shown in FIGS. 3 and 6 for example, a pair of retention strips 64 will be provided to sandwich the smaller one of the two opposite free edges of the resiliently flexible section 50 against the respective lower ring 44 of the frame. A first portion of the smaller one of the two opposite free edges of the resiliently flexible section 50 is sandwiched between the lower ring 44 and the first retention strip 64, and a second portion of the smaller one of the two opposite free edges of the resiliently flexible section 50 is sandwiched between the lower ring 44 and the second retention strip 64. Desirably, as schematically shown in FIGS. 3 and 6A for example, another pair of retention strips 65 will be provided to sandwich the larger one of the two opposite free edges of the resiliently flexible section 50 against the respective upper ring 45 of the frame. A first portion of the larger one of the two opposite free edges of the resiliently flexible section 50 is sandwiched between the upper ring 45 and the first retention strip 65, and a second portion of the larger one of the two opposite free edges of the resiliently flexible section 50 is sandwiched between the upper ring 45 and the second retention strip 65.

Each retention strip 64, 65 will have a curvature that mirrors the curvature of the respective lower ring 44 or upper ring 45 of the frame. Thus, two identical retention strips 64 will be used to attach the resiliently flexible section 50 to the lower ring 44, and similarly, two identical retention strips 65 will be used to attach the resiliently flexible section 50 to the upper ring 45. Because each respective retention strip 64, 65 forms half of a continuous hoop that is concentric with the respective lower ring 44 or upper ring 45 of the frame, the attachment or detachment of the respective free edge of the respective resiliently flexible section 50 becomes easier than would be the case where the respective retention strips 64, 65 to form a continuous hoop.

Each retention strip 64, 65 desirably can be provided with five holes, but a different number of holes can be used depending upon the size requirements of the respective hatch cone 40, 60. Each of these five (or whatever number of them) holes will align with a respective one set of five of the total of the desired ten (or whatever number of them) holes in each of the respective lower ring 44 or upper ring 45 of the frame. As schematically shown in FIGS. 3 and 6A for example, each of the holes of each retention strip 64, 65 and respective lower ring 44 and upper ring 45 will be configured to receive therethrough a quarter inch diameter hex bolt 47 having a length of about three quarters of an inch long and threaded on the end that is opposite the end with the hexagonal head. Corresponding holes also can be provided in each of the free edges of the resiliently flexible section 50. Alternatively, the hex bolt 47 can be pushed through the resiliently flexible section 50 during the attachment process and make its own hole in the resiliently flexible section 50 corresponding to the commonly aligned holes of each retention strip 64, 65 and respective lower ring 44 and upper ring 45.

In either case, a plurality of selectively detachable fasteners, such as for example threaded inserts 46 and corresponding mating threaded hex bolts 47, desirably is provided to cooperate with each retention strip 64, 65 and respective lower ring 44 or respective upper ring 45 of the frame to secure the conical outer shell 50 in place as shown in FIGS. 3, 5, 6, 6A, 7, and 8. The threaded inserts 46 and corresponding mating hex bolts 47 are reusable selectively detachable fasteners, and thus the threaded hex bolts 47 can be screwed repeatedly into and out of the threaded inserts 46 without being damaged. By being reusable, repairs in the field are facilitated without the need to maintain an inventory of selectively detachable fasteners or anything more than very basic tools and skills. Alternatively, it is possible to secure the resiliently flexible section 50 by using mechanical fasteners such as rivets, which of course are not reusable after they have been removed such as by being drilled out when it becomes necessary to remove a damaged resiliently flexible section 50 and replace it with another undamaged resiliently flexible section 50.

The inner shell 43 and the outer shell 50 define the radial boundaries of a space therebetween, and that space is a volume that is bounded above and below by the annular sections of the respective top member 41 and bottom member 42. In the embodiment of the hatch cone 60 shown in FIG. 7, a resiliently deformable damping element 55 desirably is disposed in the space 70 that is defined between the inner shell 43 and the outer shell 50 and desirably fills the entire volume. The resiliently deformable damping element 55 desirably can take the form of a truncated cone that desirably is composed of a low density closed cell foam material or other material that is a resiliently deformable shock-absorbing material. One embodiment of the damping element 55 desirably is provided by a sheet of neoprene foam that desirably has an adhesive back that attaches to the outer surface of the truncated conical inner shell 43. Desirably, the damping element 55 should have a thickness that is sufficient to fill the empty space 70 that otherwise would exist between the outer surface of the inner shell 43 and the inner surface of the outer shell 50. In an exemplary embodiment, this thickness would be on the order of one inch. In assembling the embodiment shown in FIG. 7, this damping element 55 desirably would be attached, as by adhesive material for example, to the outer surface of the truncated conical inner shell 43 in advance of attaching the resiliently flexible section 50 to the frame.

Assembly of the resiliently flexible section 50 to the frame is described with respect to FIG. 6A. The resiliently flexible section 50 desirably can be provided with a series of holes near each of the larger one of the two opposite free edges and the smaller one of the two opposite free edges. These holes in the resiliently flexible section 50 are spaced respectively to align with and coincide with the respective sets of holes through the respective upper ring 45 and associated pair of retention strips 65 and the respective lower ring 44 and associated pair of retention strips 64. Starting with the larger of the free edges of the resiliently flexible section 50, five of these holes through the resiliently flexible section 50 are placed in alignment with a set of five holes through the upper ring 45, and then one of the retention strips 65 is placed to align the holes therethrough with the now aligned holes of the upper ring 45 and resiliently flexible section 50. Then each of these three now aligned holes is provided with a three-quarter inch long and ¼ inch in diameter hex bolt 47 that is screwed into the respective threaded insert 46 that is carried in the hole that is formed in the upper ring 45. As the threaded hex bolt 47 is screwed into the threaded insert 46, the larger free edge of the resiliently flexible section 50 is held fast between the outer surface, which is the larger diameter surface, of the upper ring 45 and the inner surface, which is the smaller diameter surface, of the respective retention strip 65. This same assembly process is repeated until all of the aligned holes are filled with threaded hex bolts 47 that are screwed into the respective threaded inserts 46 for both the entirety of the upper ring 45 and the lower ring 44 and their respective pairs of retention strips 65, 64. As schematically shown in FIG. 3 for example, once all of the aligned holes are filled with threaded hex bolts 47 that are screwed into the respective threaded inserts 46 for the entirety of the lower ring 44 and their respective pairs of retention strips 64, the lower rim 67 of the hatch cone 40, 60 is completed. Similarly, as schematically shown in FIG. 3 for example, once all of the aligned holes are filled with threaded hex bolts 47 that are screwed into the respective threaded inserts 46 for the entirety of the upper ring 45 and their respective pairs of retention strips 65, the upper rim 68 of the hatch cone 40, 60 is completed.

The resiliently flexible section 50 and/or the resiliently deformable damping element 55 can become sufficiently damaged or compromised through repeated engagements with the inwardly facing upper edge 39 of the wall 28 of the tank's top hatch to warrant or necessitate repair or replacement of the resiliently flexible section 50 and/or the resiliently deformable damping element 55. Such damage can arise for example on account of wear to the top hatch, warping of same due to repeated temperature changes from weather or damage through repeated bumping during the process of aligning loading arms having less forgiving hatch cones (than those of the present invention) over the top hatch of the transport tank 32. Such damage also can arise for example on account of less than ideal alignment between less forgiving hatch cones (than those of the present invention) and the plane of the opening defined by the hatch that is caused by the operating limitations of the arm 30, uneven tracks beneath the rail car 33 carrying the transport tank 32 or a sloped grade beneath the truck carrying the transport tank.

In the event that such damage to the resiliently flexible section 50 and/or the resiliently deformable damping element 55 should occur, the provision of the cooperation between the lower ring 44 and respective retention strips 64 as well as the similar cooperation between the upper ring 45 and respective retention strips 65 greatly facilitates repair and replacement of the hatch cones 40, 60 of the present invention. The removal and subsequent replacement of a handful of selectively detachable fasteners such as hex bolts 47 or similar selectively detachable mechanical fasteners can be done quickly and easily without highly skilled labor and at the job site if necessary. Moreover, the use of a pair of retention strips 64 or 65 (rather than a continuous closed loop as a retention hoop) renders the alignment of the respective free edge of the resiliently flexible section 50 against the respective lower ring 44 or upper ring 45 that much easier, since only one half of the resiliently flexible section 50 needs to be kept in its proper place against the respective lower ring 44 or upper ring 45 prior to the affixation of the respective retention strip 64 or 65 with the associated hex bolts 47 or other suitable selectively detachable mechanical fasteners. Additionally, the location of the attachment sites for the resiliently flexible section 50 at the respective lower ring 44 and upper ring 45, each of which depending axially from the outermost periphery of the respective bottom member 42 and top member 41, ensures that there is a relatively small chance that repeated engagements of the hatch cones 40, 60 will damage either the lower ring 44, the upper ring 45 and their respective threaded inserts 46 or any of the respective retention strips 64, 65 or hex bolts 47.

As shown in FIG. 3, each hatch cone 40, 60 includes an input product pipe 24 that extends axially through each hatch cone 40, 60. In each respective embodiment of the hatch cone 40, 60 as shown in FIG. 3 and FIG. 8 for example, an aligned opening 77, 78 respectively is formed through each of the respective top member 41 and respective bottom member 42 for receiving therethrough the input product tube 24 that can be connected to the distal end of the discharge pipe 37 (shown in FIG. 2 for example) of the articulating arm 34. The input product pipe 24 has one end that projects partially above the top member 41 of the hatch cone 40, 60 and is provided with a fitting 24a. This fitting 24a can be selectively connected and disconnected to the distal end of the discharge pipe 37 (FIG. 2) of the articulating arm 34 (FIG. 2). The distal end of the discharge pipe 37 defines an outlet opening that is configured to be connected to the fitting 24a of the input product tube 24 that extends through the hatch cone 40, 60 (see e.g., FIG. 3) and so permits the flowing bulk material to be discharged from the articulating arm 34 into the transport tank 32 via the top hatch of the transport tank 32.

In one exemplary embodiment, the input product pipe 24 desirably can be provided by a four inch inner diameter IPS schedule 40 ASTM A53 B welded pipe measuring about 27⅜ inches long. The fitting 24a desirably can be effected by a four inch inner diameter stainless steel socket weld adapter 24a mounted on the free end of the input product tube 24 that is disposed above the top member 41 of the hatch cone 40, 60. As shown in FIG. 3, the input product pipe 24 with the socket weld adapter 24a desirably extends about 8 inches above the top member 41. The end of the input product pipe 24 that extends away from the bottom member 42 desirably extends about one foot from the outer surface of the bottom member 42.

As shown in FIG. 3 for example, each hatch cone 40, 60 desirably includes a vapor pipe 21 that extends through each hatch cone 40, 60. In each respective embodiment of the hatch cone 40, 60, as shown in FIGS. 3, 5 and 8 for example, a vapor pipe 21 extends through respective aligned openings 81, 82 formed in each of the respective top member 41 and respective bottom member 42 so that the distal end of the vapor pipe 21 is exposed to the interior of the transport tank 32 when the respective hatch cone 40, 60 is resting on the upper surface 29 or inwardly facing upper edge 39 of the wall 28 of the top hatch of the transport tank 32.

As shown in FIG. 5 for example, the vapor pipe 21 projects partially above the top member 41 and partially below the bottom member 42. As shown in FIGS. 3 and 5 for example, the end of the vapor pipe 21 that projects above the top member 41 desirably is provided with a fitting 21a. This fitting 21a desirably can be selectively connected and disconnected to a flexible vapor hose 22 that carries off vapor or dust that is given off by the bulk material being transported into the transport tank (not shown in FIG. 1) and allows the vapor or dust to be collected in an exhaust vessel 23 (shown in phantom in dashed line).

FIGS. 5, 6 and 7 show views of two embodiments of the hatch cones 40, 60 in the working position, which is disposed in the open hatch with the distal end of the input product pipe 24 extending through the opening 32a of the tank 32. In these views, the closures 28a (FIG. 5) for the hatch cover (not shown) have been loosened and pivoted downwardly to rest against the cylindrical wall 28 that defines the hatch, and the hatch cover (not shown) has been pivoted away from contact with the upper surface 29 of the wall 28. Typically, when the hatch cones 40, 60 are positioned in the working orientation shown in FIGS. 5, 6 and 7, the outer shell 50 of the hatch cones 40, 60 is maintained in contact with the inwardly facing upper edge 39 of the wall 28 of the hatch by means of some construct that involves the distal end of the loading arm 30. Thus, the arm 30 would be provided with a lockdown device or a chain or a rope would be provided to tie the arm 30 down with the hatch cone 40 60 in the working position or the loading arm 30 would include a pneumatic cylinder or a hydraulic cylinder that selectively raises and lowers the loading arm 30 so that a constant downward pressure can be imposed by the pneumatic or hydraulic cylinder, and that downward pressure would push the hatch cone 40, 60 down into the hatch as shown in FIGS. 5, 6 and 7 for example.

In the embodiments of the hatch cones 40, 60 depicted in FIGS. 6 and 7, the free edges of the resiliently flexible section 50 are held fixed with respect to the top member 41 and the bottom member 42. As schematically depicted in each of FIGS. 6 and 7, the central region of the resiliently flexible section 50 located between the top member 41 and the bottom member 42 is free to stretch and deform toward the conical inner shell 43 when contacted by the inwardly facing upper edge 39 of the wall 28 of the top hatch of the transport tank 32. This deformation of the resiliently flexible section 50 is sufficient to accommodate most gaps that may develop between the hatch cone 40, 60 and the inwardly facing upper edge 39 of the wall 28 of the tank's top hatch on account of wear to the top hatch or to the hatch cone 40, 60, warping of same due to repeated temperature changes from weather or damage to one or both of them through repeated bumping during the process of aligning the loading arm's hatch cone 40, 60 over the top hatch of the transport tank 32. Moreover, this deformation of the resiliently flexible section 50 is sufficient to accommodate most gaps that may develop between the hatch cone 40, 60 and the inwardly facing upper edge 39 of the wall 28 of the tank's top hatch on account of less than ideal alignment between the hatch cone 40, 60 and the plane of the opening defined by the hatch that is caused by the operating limitations of the arm 30, uneven tracks beneath the rail car carrying the transport tank or a sloped grade beneath the truck carrying the transport tank. In this way, the hatch cone 40, 60 functions as a splash guard that reduces the flow of vapors through the open top hatch of the transport tank 32. However, the hatch cone 40, 60 does not provide a vapor-tight seal that eliminates all emissions of vapor from the open top hatch of the transport tank 32 during the process of transferring the bulk material from the storage container 15 into the transport tank 32 via the loading arm 30.

As shown in FIG. 3, the hatch cones 40, 60 of the present invention can be used with a flexible delivery hose 48 that can be attached to the input product pipe 24 in lieu of a discharge pipe 37 of a loading arm 30 as the means of carrying the flowing material in bulk from a storage container 15 (FIG. 1) into a transport tank 32 (FIG. 2). A quick disconnect union 49 desirably is attached to the distal end of the delivery hose 48 and desirably is configured to be selectively attached to or detached from the input product pipe 24 via the fitting 24a that is attached to the end of the input product pipe 24 that rises above the outer surface of the top member 41.

While at least one presently preferred embodiment of the invention has been described using specific terms, such description is for illustrative purposes only, and it is to be understood that changes and variations may be made without departing from the spirit or scope of the following claims. This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A loading arm that transfers flowing bulk material from a storage vessel and into a container through a top hatch of the transport tank that is carried on a truck or rail car for transport, comprising:

a. an articulating arm including a plurality of connected hollow pipes with a plurality of successive ones of the hollow pipes connected pivotally together, one of the hollow pipes of the articulating arm defining a discharge pipe that defines at one end thereof an outlet opening configured to permit the flowing bulk material to be discharged from the articulating arm; and b. a hatch cone connected to the arm and defining a rigid frame that includes a top member defining an underside, a bottom member spaced apart in the axial direction from the top member and defining an upper surface disposed facing the underside of the top member, an inner shell defining a first opposite edge connected to the top member and a second opposite edge connected to the bottom member, an upper ring defines a cylindrical contour and is connected to the underside of the top member, a lower ring defines a cylindrical contour and is connected to the upper surface of the bottom member, wherein each one of a plurality of holes is defined radially through the upper ring, wherein each of a plurality of holes is defined radially through the lower ring, wherein each respective one of the plurality of holes is configured to receive therein a respective selectively detachable fastener, c. the hatch cone further including an input product pipe extending axially through both the top member and the bottom member, the input product pipe having a first end extending axially above the top member and connected to the outlet opening of the discharge pipe, the input product pipe having a second end disposed opposite the first end and extending axially below the bottom member, the hatch cone further including a vapor pipe extending axially through both the top member and the bottom member, d. the hatch cone further including an outer shell extending between the upper ring and the lower ring, the outer shell defining a larger diameter free edge at one end thereof and a smaller diameter free edge at an opposite end thereof, the larger diameter free edge of the outer shell being connected to the upper ring, the smaller diameter free edge of the outer shell being connected to the lower ring, the outer shell being formed of resiliently deformable material that is configured to deform resiliently upon engaging with the top hatch of the transport tank.

2. The loading arm of claim 1, further comprising a plurality of selectively detachable fasteners, wherein each respective one of the plurality of holes receives therein a respective selectively detachable fastener.

3. The loading arm of claim 2, wherein each of the plurality of selectively detachable fasteners includes a threaded insert.

4. The loading arm of claim 1, further comprising a resiliently deformable damping element that is disposed between the inner shell and the outer shell of the hatch cone, the resiliently deformable damping element being configured to deform resiliently upon the outer shell engaging with the top hatch of the transport tank.

5. The loading arm of claim 4, wherein the inner shell defines an outer surface and the resiliently deformable damping element is attached to the outer surface of the inner shell.

6. The loading arm of claim 4, wherein the inner shell and the outer shell define the radial boundaries of a space therebetween, and the resiliently deformable damping element is configured to fill that space.

7. The loading arm of claim 1, wherein the inner shell defines a truncated conical shape and a truncated conical outer surface.

8. The loading arm of claim 7, wherein the shape of the outer shell mirrors the shape of the outer surface of the inner shell.

9. The loading arm of claim 1, wherein the upper ring defines an upper end edge that is attached to the underside of the top member.

10. The loading arm of claim 1, wherein the lower ring defines a lower end edge that is attached to the upper surface of the bottom member.

11. The loading arm of claim 1, further comprising at least one retention strip connected to the larger one of the two opposite free edges of the outer shell and the upper ring of the frame.

12. The loading arm of claim 11, further comprising at least a second retention strip connected to the larger one of the two opposite free edges of the outer shell and the upper ring of the frame wherein the larger one of the two opposite free edges of the outer shell is sandwiched between the upper ring and each of the first retention strip and the second retention strip.

13. The loading arm of claim 12, further comprising a plurality of selectively detachable fasteners that cooperate with each retention strip and the upper ring of the frame to secure the larger one of the two opposite free edges of the outer shell to the frame.

14. The loading arm of claim 1, further comprising at least one retention strip connected to the smaller one of the two opposite free edges of the outer shell and the lower ring of the frame.

15. The loading arm of claim 14, further comprising at least a second retention strip connected to the smaller one of the two opposite free edges of the outer shell and the lower ring of the frame, wherein a first portion of the smaller one of the two opposite free edges of the outer shell is sandwiched between the lower ring and the first retention strip and a second portion of the smaller one of the two opposite free edges of the outer shell is sandwiched between the lower ring and the second retention strip.

16. A hatch cone for disposition at the discharge end of a loading arm or flexible delivery hose that transfers flowing bulk material from a storage vessel and into a transport tank through a top hatch of the transport tank that is carried on a truck or rail car for transport, the hatch cone comprising:

a. a top member defining an underside, a bottom member spaced apart in the axial direction from the top member and defining an upper surface disposed facing the underside of the top member, an inner shell defining an outer surface and having a first edge connected to the top member and a second edge disposed axially opposite the first edge and connected to the bottom member, an upper ring defines a cylindrical contour and is connected to the underside of the top member, a lower ring defines a cylindrical contour and is connected to the upper surface of the bottom member, wherein each one of a plurality of holes is defined radially through the upper ring, wherein each one of a plurality of holes is defined radially through the lower ring, wherein each respective one of the plurality of holes is configured to receive therein a respective selectively detachable fastener;

b. an input product pipe extending axially through both the top member and the bottom member, the input product pipe having a first end extending axially above the top member, the input product pipe having a second end disposed opposite the first end and extending axially below the bottom member, the hatch cone further including a vapor pipe extending axially through both the top member and the bottom member;

c. an outer shell extending between the upper ring and the lower ring and defining a larger diameter free edge at one end thereof and a smaller diameter free edge at an opposite end thereof, the larger diameter free edge of the outer shell being connected to the upper ring, the smaller diameter free edge of the outer shell being connected to the lower ring, the outer shell being formed of resiliently deformable material that is configured to deform resiliently upon engaging with the top hatch of the transport tank.

17. The hatch cone of claim 16, further comprising a resiliently deformable damping element disposed between the inner conical shell and the outer conical shell and configured to deform resiliently upon the conical outer shell engaging with the top hatch of the transport tank.

18. The hatch cone of claim 16, further comprising at least one retention strip connected to the smaller one of the two opposite free edges of the resiliently flexible section and the respective lower ring of the frame.

19. The hatch cone of claim 18, further comprising at least a second retention strip connected to the smaller one of the two opposite free edges of the resiliently flexible section and the respective lower ring of the frame, wherein a first portion of the smaller one of the two opposite free edges of the resiliently flexible section is sandwiched between the lower ring and the first retention strip and a second portion of the smaller one of the two opposite free edges of the resiliently flexible section is sandwiched between the lower ring and the second retention strip.

20. A loading arm that transfers flowing bulk material from a storage vessel and into a container through a top hatch of the transport tank that is carried on a truck or rail car for transport, comprising:
   a. an articulating arm including a plurality of connected hollow pipes with a plurality of successive ones of the hollow pipes connected pivotally together and configured to permit the flowing bulk material to be discharged from the articulating arm; and
   b. a flexible hose defining a proximal end and a distal end opposite the proximal end, the proximal end being connectable in communication with the storage vessel via the hollow pipes;
   c. a hatch cone connected to the distal end of the hose and defining a rigid frame that includes a top member defining an underside, a bottom member spaced apart in the axial direction from the top member and defining an upper surface disposed facing the underside of the top member, a truncated conical inner shell having a first opposite edge connected to the top member and a second opposite edge connected to the bottom member and defining a truncated conical outer surface, an upper ring that defines a cylindrical contour and is connected to the underside of the top member, a lower ring that defines a cylindrical contour and is connected to the upper surface of the bottom member, wherein each one of a plurality of holes is defined radially through the upper ring, wherein each of a plurality of holes is defined radially through the lower ring, wherein each respective one of the plurality of holes is configured to receive therein a respective selectively detachable fastener,
   d. the hatch cone further including an input product pipe extending axially through both the top member and the bottom member, the input product pipe having a first end extending axially above the top member and connected to the distal end of the hose, the input product pipe having a second end disposed opposite the first end and extending axially below the bottom member, the hatch cone further including a vapor pipe extending axially through both the top member and the bottom member,
   e. the hatch cone further including a truncated conical outer shell extending between the upper ring and the lower ring and shaped to mirror the shape of the conical outer surface of the inner truncated conical shell, the truncated conical outer shell defining a larger diameter free edge at one end thereof and a smaller diameter free edge at an opposite end thereof, the larger diameter free edge of the truncated conical outer shell being connected to the upper ring, the smaller diameter free edge of the conical outer shell being connected to the lower ring, the truncated conical outer shell being formed of resiliently deformable material that is configured to deform resiliently upon engaging with the top hatch of the transport tank.

\* \* \* \* \*